Jan. 21, 1930.  C. N. WHITAKER  1,744,429
APPARATUS FOR REACTIVATING CHARCOAL
Filed Dec. 7, 1926  2 Sheets-Sheet 1
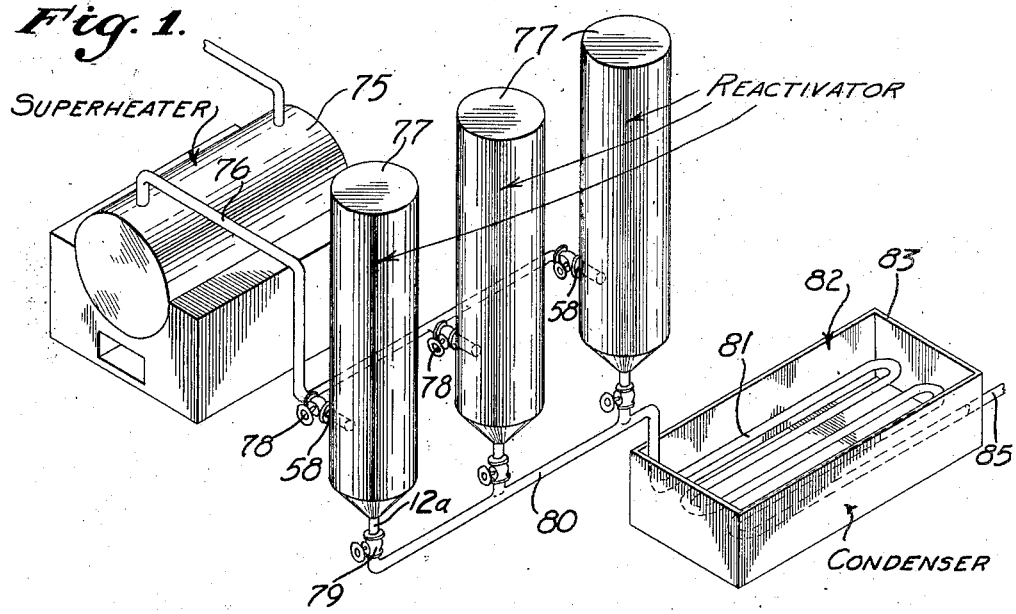
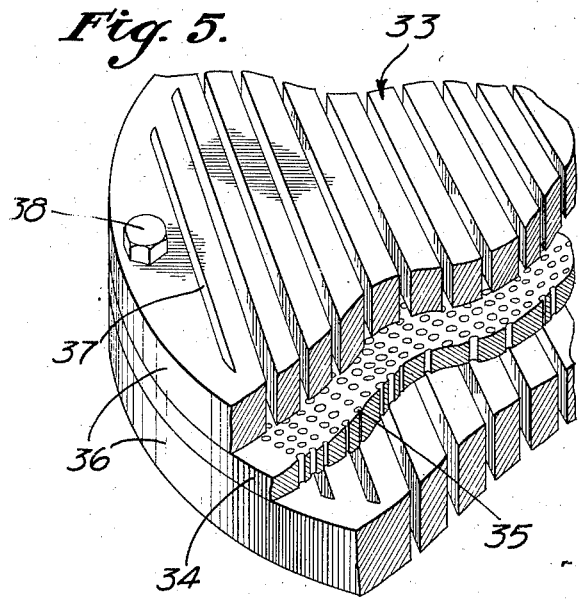
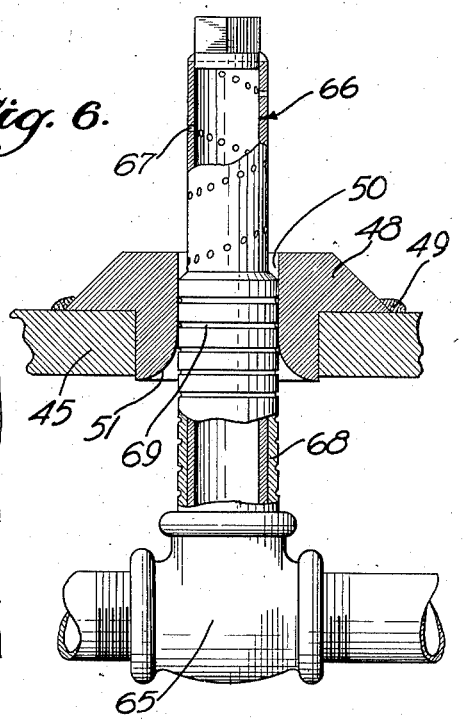
INVENTOR:
CHARLES N. WHITAKER
BY
ATTORNEY.

Jan. 21, 1930.　　C. N. WHITAKER　　1,744,429
APPARATUS FOR REACTIVATING CHARCOAL
Filed Dec. 7, 1926　　2 Sheets-Sheet 2
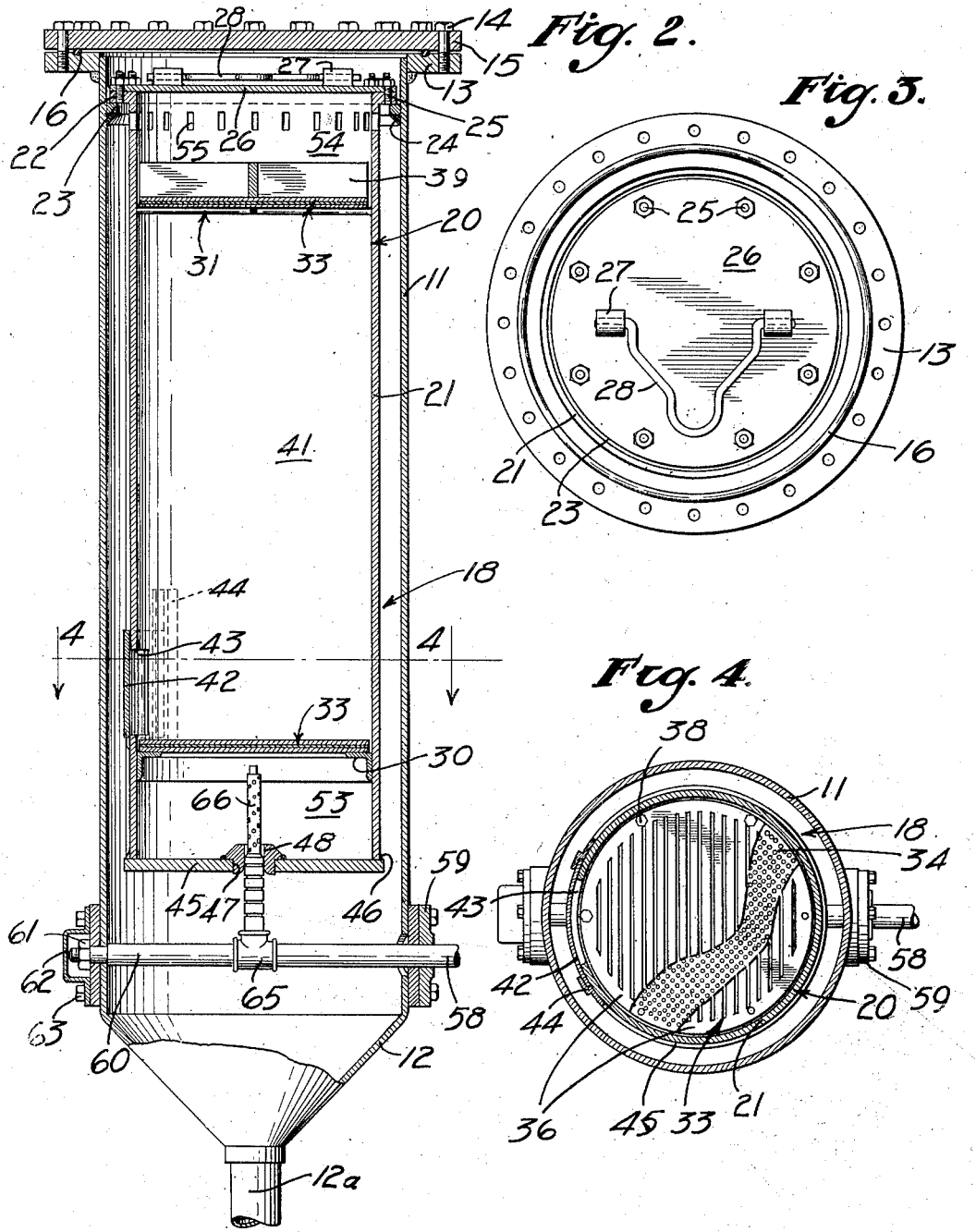

Patented Jan. 21, 1930

1,744,429

UNITED STATES PATENT OFFICE

CHARLES N. WHITAKER, OF WILMINGTON, CALIFORNIA, ASSIGNOR TO SHELL COMPANY OF CALIFORNIA, OF SAN FRANCISCO, CALIFORNIA, A CORPORATION OF CALIFORNIA

APPARATUS FOR REACTIVATING CHARCOAL

Application filed December 7, 1926. Serial No. 153,170.

My invention relates to the reactivation of charcoal and particularly to an apparatus for reactivating charcoal which has been used in the recovery of gasoline from natural gas.

Natural gas sometimes contains particles of gasoline, and it is common practice to remove the gasoline particles from the natural gas by passing the gas through bodies of charcoal. The charcoal which is in a state of fine sub-division adsorbs the gasoline particles, the natural gas passing freely therethrough. When the charcoal has adsorbed gasoline particles to its capacity, the gasoline particles are recovered from the charcoal by passing steam therethrough. The gasoline particles are vaporized and are carried with the steam to a suitable condenser where the steam and gasoline vapors are condensed, the condensate being later separated. The charcoal by this process is not entirely free of the gasoline and heavier oil particles usually carried by the gas and the charcoal clogs so that the adsorbing efficiency is considerably reduced. After repeated usage the charcoal becomes inefficient, but since the charcoal is very expensive, costing about one dollar a pound, it cannot be thrown away; therefore, the ordinary adsorption plant is operated on a very inefficient basis.

I have found that reactivation of the charcoal is possible by subjecting it to the action of superheated steam at temperatures of from 1100° F. to 1200° F. for about one hour. This treatment removes any remaining gasoline content and any substance which is deposited by the gas tending to clog the charcoal, and restores the charcoal to an efficiency of about 92%.

It is an object of this invention to provide an apparatus for reactivating charcoal which restores charcoal with its adsorbing qualities and makes it at least 92% efficient.

Another object of the invention is to provide an apparatus of this nature which is capable of handling large quantities of charcoal.

Other objects and advantages of the invention will be made evident hereinafter.

Referring to the drawings in which I illustrate my invention.

Fig. 1 is a perspective view showing the manner in which the reactivator of my invention is connected in a reactivation system.

Fig. 2 is a vertical section through the invention.

Fig. 3 is a plan view of Fig. 2, the cover being removed.

Fig. 4 is a section taken on the line 4—4 of Fig. 2.

Fig. 5 is an enlarged fragmentary perspective view of a screen member of the invention.

Fig. 6 is an enlarged fragmentary section of a steam supply means of the invention.

Referring to Figs. 2 to 6 inclusive, my invention provides a shell 11 which has a conical bottom 12 to which a discharge pipe 12$^a$ is connected. The upper end of the shell 11 has a flange 13 welded thereto and secured to the flange 13 by bolts 14 is a cover plate 15. A gasket 16 is placed between the flange 13 and the cover plate 15 for providing a tight seal at this point. The shell 11 and cover plate 15 cooperate to provide a treating chamber 18.

Adapted to rest in the treating chamber 18 is a basket 20 which has a shell 21 which may be made from standard black pipe. The shell 21 is of smaller diameter than the diameter of the shell 11 so that an annular space exists between these two parts. The upper end of the shell 21 of the basket 20 is provided with a flange 22 which engages a supporting ring 23 which is secured by welding 24 to the shell 11 in the upper end of the treating chamber 18. The basket 20 is supported by the supporting ring 23. Secured to the flange 22 by stud bolts 25 is a cover 26. The cover 26 is provided with bearings 27 by means of which a bail 28 by which the basket 20 is handled is attached to the cover 26. Secured to the shell 21 on the inside thereof and near the lower end thereof is a member providing an annular flange 30. Secured to the inside of the shell 21 near the upper end thereof is a support 31 which consists of cross bars, the ends of which may be welded to the inner face of the shell 21. Supported by the flange and the support 31 are screen members 33.

The screen members 33 are shown in detail in Fig. 5. These members consist of a central screen plate 34 which is provided with a multiplicity of openings 35. The screen plates 34 are made from Monel metal and are 30 mesh, 30 gauge. Slotted plates 36 having elongated slots 37 are placed on opposite sides of each screen plate 34, the three plates of each screen member being secured together by bolts 38. If desired the screen member 33 resting on the annular flange 30 may be secured thereto. The upper screen member 33 is retained in place by means of a weight 39 which is in the shape of a cross as shown in Fig. 2 so that there will be a minimum of resistance to steam passing upward through the basket. The space within the shell 21 and between the screen members 33 provides a charcoal chamber 41 in which charcoal to be reactivated may be placed. A door 42 shown in Figs. 2 and 4 is provided for closing a discharge opening 43 through which charcoal, after it has been treated, may be discharged from the charcoal chamber 41. The door is slidably attached to the shell 21 by vertical slides 44.

Attached to the extreme lower end of the shell 21 is a bottom plate 45 which may be secured in place by welding 46. The bottom plate 45 is provided with a central opening 47 in which a collar 48 is secured. The collar 48 is welded to the bottom plate 45 as indicated at 49. The collar 48 is provided with a central opening 50, the lower end of which is rounded outward as indicated at 51.

The lower end of the shell 21 is provided with a steam inlet chamber 53 between the lower plate 45 and the lower screen member 33, and is provided with a steam outlet space 54 between the cover 26 and the upper screen member 33. The shell 21, as shown best in Fig. 2 is provided with a number of openings 55 through which the steam may pass to the exterior of the basket 20.

Adverting to Figs. 2 and 6, a steam inlet pipe 58 is extended into the lower end of the chamber 18 through packing plates 59. An end 60 of the pipe 58 is extended through the opposite side of the shell 11 from which the pipe 58 enters and has a nut 61 screwed thereonto, this construction being for the purpose of rigidifying the pipe 58. A cover 62 is secured over the end 60 by bolts 63 for the purpose of providing a seal so that there will be no leakage at this point. The pipe 58 is provided with a T-fitting 65 where it crosses the center of the shell 11. Extended upward from the T-fitting 65 is a nozzle 66. The nozzle 66 extends upward through the opening 50 in the collar 48, and the end which extends into the steam inlet chamber 53 is provided with orifices 67. The lower part of the nozzle 66 is enlarged such as by welding 68 or in any other suitable manner so that the size of this portion of the nozzle will have a sliding fit in the opening 50 of the collar 48. The enlarged portion is provided with a series of annular grooves 69 in which water condensed from steam may remain and provide a seal around the nozzle which prevents steam from passing downward through the opening 50 into the lower part of the treating chamber 18.

Referring to Fig. 1, I diagrammatically show a steam superheater 75 having a superheated steam pipe 76 which is connected to steam pipes 58 of a series of reactivators of my invention generally indicated by the numerals 77. The steam inlet pipes 58 are provided with shut-off valves 78. The discharge pipe 12ª of each reactivator 77 is provided with a valve 79 and is connected to a pipe 80. The pipe 80 extends to a coil 81 of a box condenser 82, which coil 81 is placed in a tank 83 filled with a cooling medium. A pipe 85 extends from the coil 81 to a suitable sump.

The operation of the invention is carried on as follows:

After charcoal has become clogged with oily matter it is placed in the chamber 41 of the basket 20. In order to do this, it is necessary to remove the cover plate 15 of the shell 11 and to lift the basket 20 from the treating chamber 18. This is conveniently accomplished by attaching a chain block to the bail 28 of the basket. After the basket is removed from the chamber 18 the cover 26 is removed from place and the weight 39 and the upper screen member 33 are also removed. The charcoal is then placed in the charcoal chamber 41, after which the upper screen member 33, the weight 39, and the cover 26 are replaced into the position shown in the drawings. The basket 20 is then lowered into the chamber 18 so that it is supported by the supporting ring 23. The nozzle 66 is guided through the opening 50 in the collar 48 by the rounded part 51. This avoids any difficulty in lowering the basket into proper position. The cover plate 15 is then secured in place as shown in the drawings.

The valve 78 of the reactivator 77 which has just been charged is then opened and steam will pass through the pipe 58 of this reactivator through the nozzle 66 into the steam inlet chamber 53. Steam passes upward through the lower screen member 33 and through the body of charcoal to be reactivated. Steam passes through the upper screen member 33 and into the steam outlet chamber 54. It is conducted from the steam outlet chamber 54 through the openings 55 into the portion of the treating chamber 18 which surrounds the basket 20. In passing through the reactivating chamber 41 any gasoline particles and any clogging particles carried in the charcoal are vaporized and are taken from the charcoal with the steam. The charge of charcoal in the chamber 41 is preferably subjected to the action of steam under a pressure of about thirty-five pounds per square inch at a temperature of eleven hundred degrees Fahrenheit to twelve hundred degrees Fahrenheit for a period of one hour. When treatment is carried on under these specifications it is found that the charcoal is reactivated so that it is substantially ninety-two or more per cent efficient. The steam carrying the gasoline and clogging particles which are in vapor form passes through the discharge pipe 12ª, the pipe 80 to the box condenser 82 where the temperature is lowered sufficiently to prevent a flashing of the oil particles when they are released to the atmosphere. The steam and gasoline and clogging particles are conducted through a pipe 85 to any suitable outlet means.

In the arrangement shown in Fig. 1, a battery of reactivators 77 is provided so that while one reactivator is being charged, treating may be carried on in another, and cooling of the charge before removing it may be taking place in the remaining activator. The charcoal is removed from the basket 20 through the opening 43 which is closed by the door 42. The basket must be removed from the treating space 18 and the door 42 slid upward from the position shown in the drawings in order to remove the reactivated charcoal from the chamber 41.

From the foregoing description it will be seen that the invention provides an apparatus for restoring a charcoal with adsorption qualities so that it may efficiently remove gasoline particles from natural gas. The design of the apparatus is important and the apparatus shown is very efficient in reactivation and will stand up under the high temperatures. The screen members 33 are designed from three plates to prevent leakage of charcoal from the chamber 41. The charcoal is in a state of fine sub-division and an ordinary screen would not serve to retain it in the chamber 41. The screen member 33 is capable of withstanding the high temperatures to which it is subjected. The provision of the grooves 60 in the large part of the nozzles 66 is important since it serves as a means for collecting condensates of the steam, these condensates forming a seal around the lower part of the nozzle which prevents steam from leaking through the opening 50 into the lower part of the treating chamber 18.

I claim as my invention:

1. A charcoal reactivator comprising: an outer shell providing a treating chamber; an upright basket adapted to be removably supported and laterally spaced, in said treating chamber; having a charcoal chamber for the material to be reactivated, said basket having an inlet through which steam may be introduced into said basket and an outlet means through which said steam may pass from said basket into said treating chamber, and said basket being closed by a removable cover at its upper end and having a door near its lower end; means for introducing steam into said basket; and means for conveying steam from the lower end of said treating chamber.

2. A charcoal reactivator comprising: an outer shell providing a closed treating chamber; a basket removably supported and laterally spaced in said treating chamber comprising a shell with steam outlet openings in its upper part; upper and lower perforated screen members supported in said shell of said basket, the lower screen at a substantial distance from the bottom of the basket shell and both screens extending horizontally across the chamber of the basket shell and spaced from each other, and a lower plate attached to said shell of said basket and closing the lower extremity thereof; a steam inlet pipe extended into said treating chamber; a nozzle connected to said steam inlet pipe and extended through an opening sealable by liquid in said lower plate; and means for removing said steam from said treating chamber.

3. A combination as defined in claim 2 in which the portion of said nozzle in said opening of said lower plate is provided with annular channels in which water may collect to form a seal.

4. A combination as defined in claim 2 in which said basket has a weight for holding said upper screen member in place.

5. A charcoal reactivator comprising: an outer shell providing a closed treating chamber; a basket removably supported and laterally spaced in said treating chamber comprising a shell with steam outlet openings near the upper part thereof, said steam outlet openings communicating with said treating chamber, upper and lower perforated screen members supported in said shell of said basket, the lower screen at a substantial distance from the bottom of the basket shell and both screens extending horizontally across the chamber of the basket shell and spaced from each other, and a lower plate attached to said shell of said basket and closing the lower extremity thereof; a steam inlet pipe extended into said treating chamber; a nozzle connected to said steam inlet pipe and extended through an opening in said lower plate in such a manner as to form a junction sealable by liquid; and means for removing said steam from said treating chamber.

6. A charcoal reactivator comprising: an outer shell providing a closed treating chamber; an upright removable basket shell supported near its top in and by the first mentioned shell and laterally spaced therefrom, said basket shell having openings communicating with the upper part of said treating chamber; a cover for and removably secured to the top of said basket shell; a lower plate secured to the bottom of said basket shell and closing the lower extremity thereof; a steam inlet pipe sealable by water of condensation extending through said lower plate; upper and lower perforated screen members supported in said basket shell, the lower screen at a substantial distance from the bottom of the basket shell and both screens extending horizontally across the chamber of the basket shell and spaced from each other, and providing a charcoal chamber therebetween; and means for removing steam from said treating chamber.

7. A charcoal reactivator comprising: an outer shell providing a closed treating chamber; an upright basket shell removably supported near its top in and by the first mentioned shell and laterally spaced therefrom, said basket shell having openings communicating with the upper part of said treating chamber; a cover for and secured to the top of said basket shell; a lower plate secured to the bottom of said basket shell and closing the lower extremity thereof; a steam inlet pipe extending through said lower plate, having a nozzle, the entrance of said nozzle into said plate being sealable by water of condensation; upper and lower perforated screen members supported in said basket shell, the lower screen at a substantial distance from the bottom of the basket shell and both screens extending horizontally across the chamber of the basket shell and spaced from each other, and providing a charcoal chamber therebetween, said upper screen member being supported a distance below said openings and said lower screen member being supported a distance above said nozzle; and means for removing steam from said treating chamber.

8. A charcoal reactivator comprising: an outer shell providing a closed treating chamber; an upright basket shell supported near its top in and by the first mentioned shell and laterally spaced therefrom, said basket shell having openings communicating with said treating chamber; a cover for and secured to the top of said basket shell; a lower plate secured to the bottom of said basket shell and closing the lower extremity thereof; a steam inlet pipe extending through said lower plate; upper and lower perforated screen members supported in said basket shell, the lower screen at a substantial distance from the bottom of the basket shell and both screens extending horizontally across the chamber of the basket shell and spaced from each other, and providing a charcoal chamber therebetween, each of said screen members comprising a screen plate placed between two slotted plates; and means for removing steam from said treating chamber.

In testimony whereof, I have hereunto set my hand at Wilmington, California, this 1st day of December, 1926.

CHARLES N. WHITAKER.

CERTIFICATE OF CORRECTION.

Patent No. 1,744,429.             Granted January 21, 1930, to

CHARLES N. WHITAKER.

It is hereby certified that the assignee in the above numbered patent was erroneously described and specified as "Shell Company of California, of San Francisco, California, a corporation of California", whereas said assignee should have been described and specified as "Shell Oil Company, of San Francisco, California, a corporation of California", as shown by the records of assignments in this office; and that the said Letters Patent should be read with this correction therein that the same may conform to the record of the case in the Patent Office.

Signed and sealed this 1st day of April, A. D. 1930.

(Seal)
                                                     M. J. Moore,
                                       Acting Commissioner of Patents.